Feb. 28, 1928.
L. GREEN
1,660,872
HOLDER FOR REGISTRATION CERTIFICATES AND THE LIKE
Filed Feb. 8, 1927
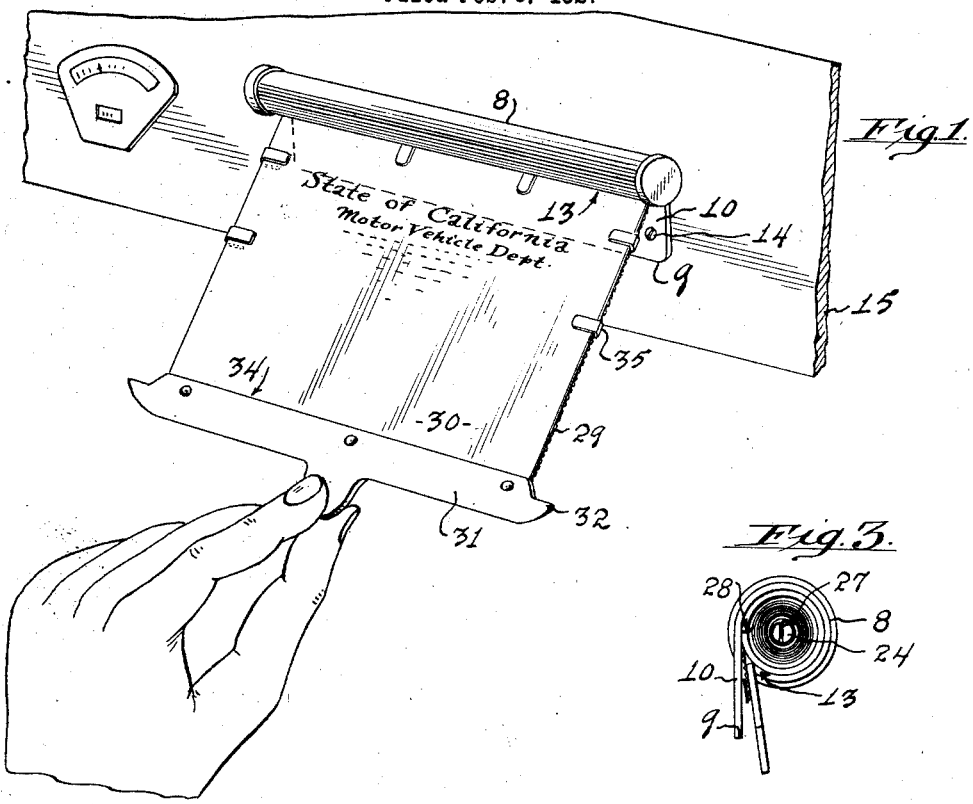
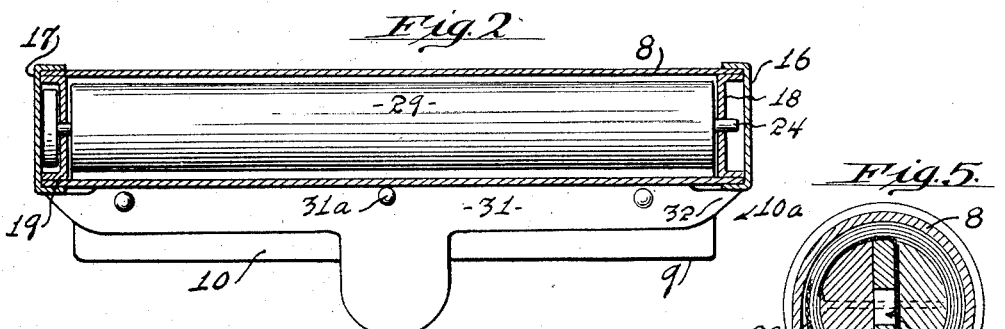
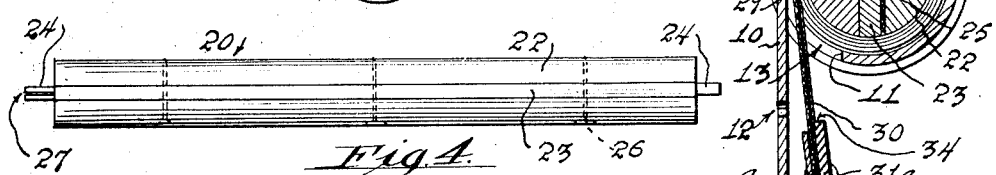
Inventor
Lulu Green
by J. W. Sheely
Attorney Patented Feb. 28, 1928.

1,660,872

UNITED STATES PATENT OFFICE.

LULU GREEN, OF LOS ANGELES, CALIFORNIA.

HOLDER FOR REGISTRATION CERTIFICATES AND THE LIKE.

Application filed February 8, 1927. Serial No. 166,645.

My invention relates to holders for automobile registration certificates. Laws, which are practically universal, require that the registration certificate of a motor vehicle be kept in such position in the driver's compartment that it may be readily examined by any whom it may concern.

The instrument boards of pleasure vehicles practically are given over to the necessary instruments and do not afford room for the full display of a registration certificate without having their ornamental appearance impaired. Other parts of the driver's compartment are not well suited for holding the certificate, inasmuch as the certificate and holders cannot be conveniently placed in a truly visible position, and if they are placed according to legal requirements, they are subject to damage by the driver's feet or detract from the neat appearance of the interior of the compartment. In open cars, such certificates and holders are subject to moisture and dust.

It is therefore one object of my invention to provide an ornamental and compact holder which may be substantially secured to the instrument board without detracting from the appearance thereof and without occupying more than a comparatively limited area.

Another object of the invention is to provide a registration certificate holder which will hold the certificate so that it may be exposed to full view while otherwise protecting the certificate at all times from damage by the elements.

Another object of the invention is to provide a substantial and ornamental holder which is inexpensive to manufacture and which may be sold at moderate cost.

My invention contemplates the use of a spring actuated roller contained within a suitable casing, and it is therefore another object of the invention to provide a less expenisve and less complicated arrangement of parts than such as are commonly employed in spring actuated rollers.

Inasmuch as registration certificates are periodically renewed, it is another object of the invention to provide a holder which while holding a certificate satisfactorily will permit of easy and expeditious replacement of a certificate.

Still other objects and advantages of my invention will appear hereinafter.

I have illustrated my invention by the accompanying drawings in which I have shown one practical embodiment.

In the said drawings:—

Figure 1 is a perspective of such embodiment showing it in place on an instrument board.

Figure 2 is a plan view partly in section thereof with the parts in normal position.

Figure 3 is a view in end elevation showing a cap removed to reveal underlying parts.

Figure 4 is a plan view of a part hereinafter known as the roller.

Figure 5 is an enlarged detail cross section of the device.

Figure 6 is a fragmentary view in section through one of the parts hereinafter known as a clip.

More specifically, in carrying out my invention in the present embodiment, I provide a casing member 8, which is formed from a single rectangular flat blank of sheet metal rolled to form a tubular casing. One end 9 of the metal is continued tangentially to form an extension 10. The other end 11 of the metal terminates slightly above the portion 10 to provide a slit or elongated opening 13 extending from end to end of the casing. The portion 10 is provided with spaced holes 12 whereby bolts, rivets, screws or the like, such as 14, may be employed for holding the casing permanently secured to the instrument board 15, or to any other suitable object.

The portion 10 is cut away slightly at each side to provide for attaching end caps 16 and 17, respectively, to close the open ends of the casing.

In each open end of the casing there is pressed a bearing 18 and 19, respectively, which are of cup form to fit snugly in the tubular part of the casing. Within the casing I provide a roller 20, composed of two half round pieces of wood 22 with an intermediate metal strip 23. The metal strip has round ends 24; each passing revolubly through a corresponding bearing. The strip intermediate the rounded ends is flattened and provided with a longitudinal slot 25. The pieces of wood 22 are secured together with the strip 23 by tacks 26, which pass through the slotted part of the strip 23. One end of the strip or shaft 23 where it protrudes through the corresponding bearing is provided with a transverse slot 27. The corresponding bearing cup is also provided with a slot 28. A coiled spring of the watch spring type is fitted in the corresponding bearing cup and has its respective ends secured by passing through respective slots 27 and 28. Thus the roller is held so that when revolved in one direction, the spring stores energy to turn it back; the spring and roller acting similarly to the corresponding parts of a common shade roller.

I provide a flexible member 29 for holding the flexible registration certificate 30. This member may be composed of suitably tough fabric and is secured at its inner end between the roller members. At the other end there is provided a pull 31. This member 31 is of suitable material, such as fiber, and extends transversely of the flexible member 29. The pull 31 is of such length as to extend at each end, as at 32. The extensions 32 cannot move into the slotted opening of the casing by reason of them being arranged to abut the corresponding end caps 16 and 17, respectively.

The pull is secured to the flexible member by means of rivets 33 or the like which are spaced suitably from the upper edge of the pull thereby to provide a pocket, as at 34, into which one edge of the registration certificate fits snugly. Secured to the flexible member there is secured a plurality of spaced clips 35, made of deformable material which may be bent over the certificate to hold same in place contiguous to the flexible member.

To apply a certificate to the holder, the lower edge of the certificate is introduced under the edge 34 of the member 31, whereby it is frictionally held. This is done while the tab 36 on the pull is being held against the tension of the spring actuated roller. Such tension, and such holding of the tab (see Fig. 1), causes the pull to assume parallel contiguity with the flexible member, with the result that the lower edge of the certificate is properly held while the clips are being bent over the other edges of the certificate. When the clips are disposed, as shown in Fig. 1, the certificate is held securely and the pull may be released.

The tension of the spring revolves the roller and winds the flexible member and the certificate thereof, and the flexible member and certificate are thereby drawn into the casing. The certificate is now contained within the metal casing and is rolled closely between the fabric convolutions of the flexible member. Thus it is protected from harm while being readily accessible for inspection. The casing may be marked to indicate that it contains the registration certificate and the tab may be marked "Pull".

Any one wishing to examine the certificate merely pulls on the tab until the certificate is exposed to view. No harm can come from suddenly releasing the tab. In such case the projecting ends of the pull merely strike the closure caps at respective ends of the casing and the moving parts are brought to rest without damage.

It will be apparent now that I have provided a simple, compact and efficient holder for the purpose specified and which is well adapted for location on the instrument board or in any other suitable parts of an automobile. While I have shown and described a specific embodiment of my invention, I do not limit myself thereto, and I may employ any suitable construction or arrangement of parts without enlarging the scope of my invention as set forth in the appended claims.

I claim:—

1. In a device of the class described, a blank of metal rolled upon itself to provide a tubular casing with a forwardly directed tangential extension; one end of said blank terminating in slightly spaced parallel relation to the said extension to provide a slot extending from end to end of said casing; the extension being of reduced width relative to said casing so that the tubular portion of the casing extends beyond said extension at both ends respectively, bearing cups; one for each end of and fitted in the tubular portion of the casing, circular caps; one for each projecting end of said tubular casing and fitted over respective projecting ends of the casing whereby the terminations of the said slot are closed, a roller in said tubular casing bearing in said bearing cups, a flexible roll around said roller movable through said slot, and a pull tab at the outer end of said flexible roll and projecting at each end beyond said extension for the purpose set forth.

2. In a device of the class described, a blank of metal rolled upon itself to provide a tubular casing with a forwardly directed tangential extension; one end of said blank terminating in slightly spaced parallel relation to the said extension to provide a slot extending from end to end of said casing; the extension being of reduced width relative to said casing so that the tubular portion of the casing extends beyond said extension at both ends respectively, bearing cups; one for each end of and fitted in the tubular portion of the casing, circular caps; one for each projecting end of said tubular casing and fitted over respective projecting ends of the casing whereby the terminations of the said slot are closed, a roller in said tubular casing bearing in said bearing cups, a flexible roll around said roller movable through said slot, a pull tab at the outer end of said flexible roll and projecting at each end beyond said extension, and a spring for actuating said roller; said spring being coiled within one of said bearing cups and attached at one end to said roller and at the other end to its cup.

LULU GREEN.